(No Model.) 3 Sheets—Sheet 1.
F. LAUHOFF.
ROLLER MILL.
No. 333,866. Patented Jan. 5, 1886.
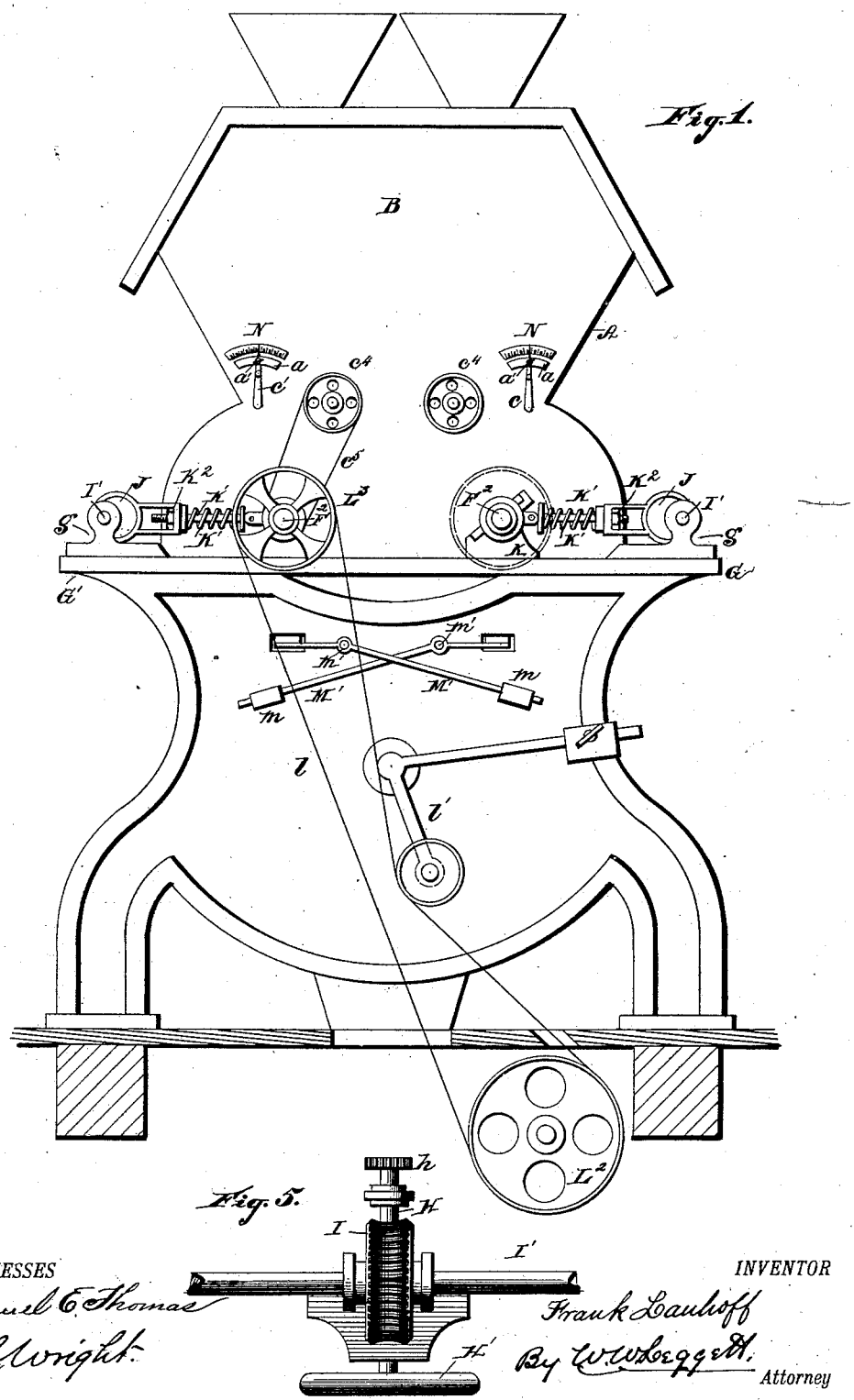

(No Model.) 3 Sheets—Sheet 2.
F. LAUHOFF.
ROLLER MILL.
No. 333,866. Patented Jan. 5, 1886.
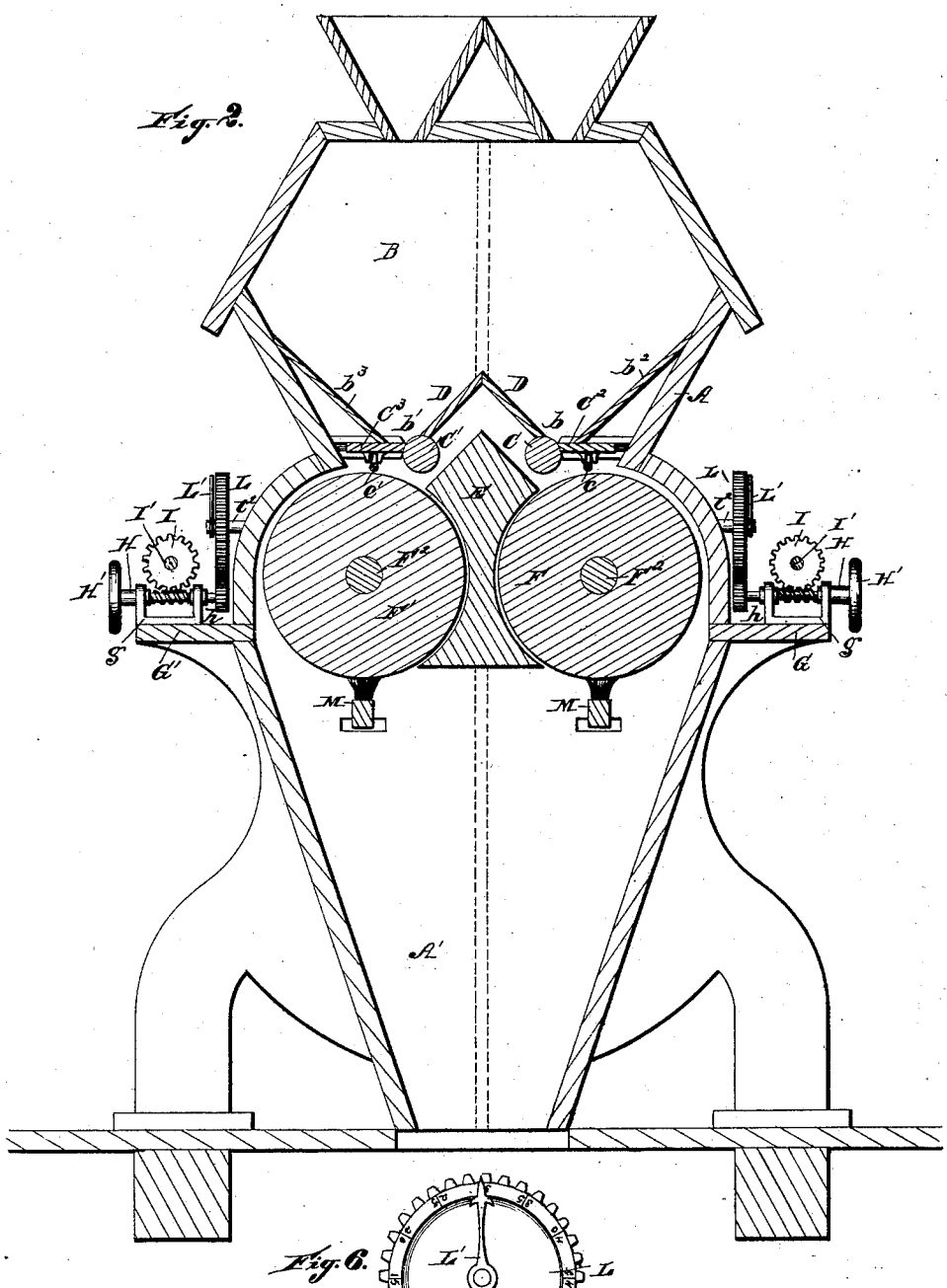

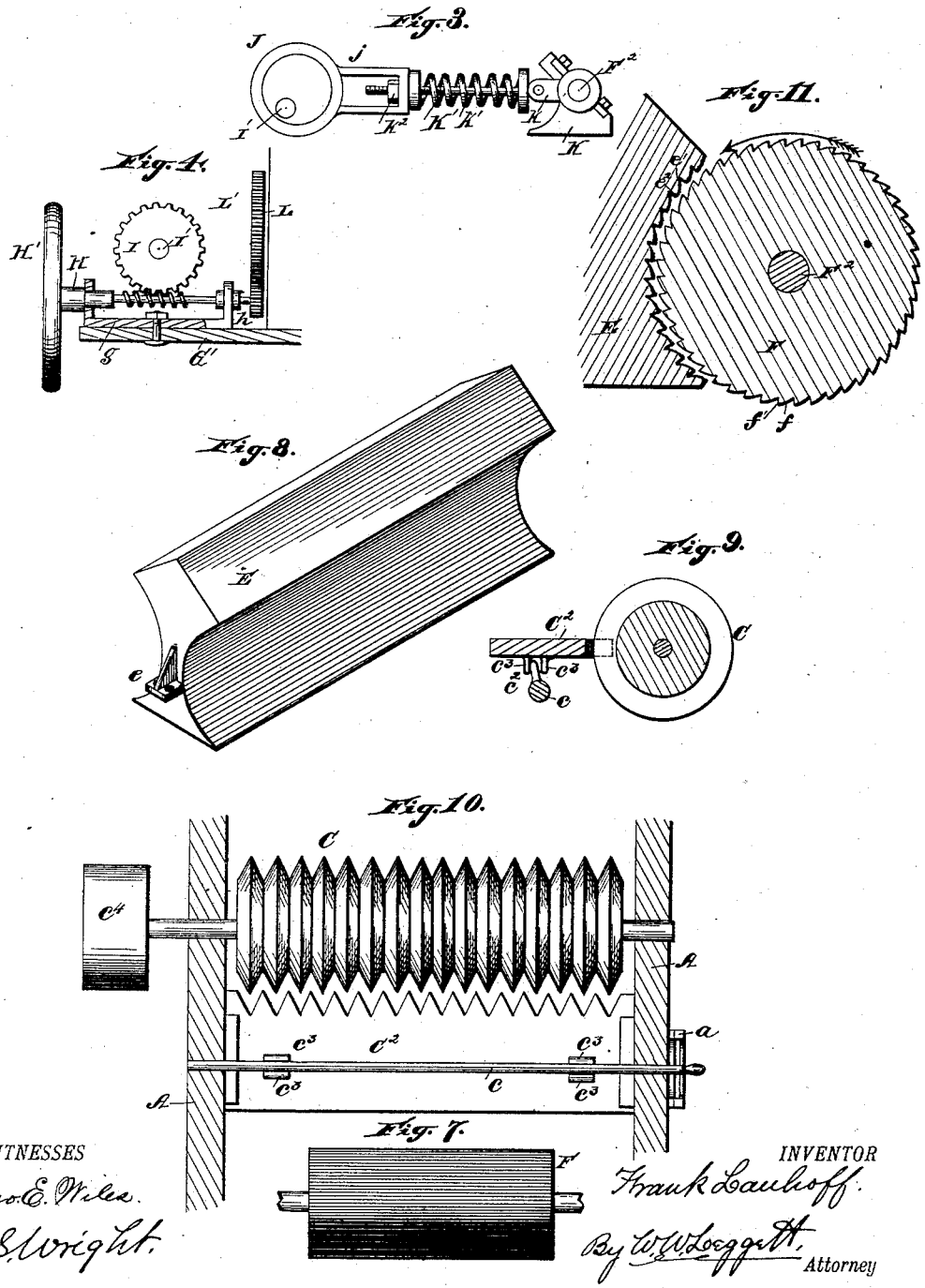

UNITED STATES PATENT OFFICE.

FRANK LAUHOFF, OF DETROIT, MICHIGAN.

ROLLER-MILL.

SPECIFICATION forming part of Letters Patent No. 333,866, dated January 5, 1886.

Application filed January 13, 1885. Serial No. 152,767. (No model.)

*To all whom it may concern:*

Be it known that I, FRANK LAUHOFF, of Detroit, county of Wayne, and State of Michigan, have invented certain new and useful Improvements in Roller-Mills; and I declare the following to be a full, clear, and exact description of the same, such as will enable others skilled in the art to which it pertains to make and use it, reference being had to the accompanying drawings, which form a part of this specification.

My invention relates to roller-mills; and it consists of the combinations of devices hereinafter specified, and more particularly pointed out in the claims.

In the drawings, Figure 1 is an end elevation of my improved roller-mill. Fig. 2 is a vertical section. Fig. 3 is a separate view of the eccentric and its connecting parts. Fig. 4 is a separate view of the worm-gear. Fig. 5 is an additional view illustrating the worm-gear. Fig. 6 is a separate view of the indicator connected therewith. Fig. 7 is a separate view of one of the grinding-rollers. Fig. 8 is a perspective view of the grinding-bed. Fig. 9 is a vertical section of a feed-roll and feed-gate; Fig. 10, a separate inverted plan view of the same. Fig. 11 illustrates the corrugations of the grinding-rollers and grinding-bed.

A represents any suitable case.

B is the hopper.

C and C' represent the feed-rollers suitably located at the throats $b$ $b'$ of the hopper. These feed-rollers are constructed with a series of annular corrugations or teeth, as shown more particularly in Fig. 10.

$C^2$ and $C^3$ represent feed-gates located in the throats of the hopper for adjusting the feed to the grinding-rolls. These gates are adjusted upon crank-shafts $c$ $c'$, the crank ends of said shafts extending to the exterior of the case, as shown in Fig. 1. Said shafts are constructed with projecting arms or fingers $c^2$, engaging with suitable shoulders, $c^3$, upon the gates, as shown in Fig. 9. It is thus obvious that when said shafts are rotated said gates will be reciprocated to and from the feed-rollers, as may be desired to widen or narrow the throats. These feed-gates are also toothed upon their edges adjacent to the rolls in such a manner that the feeding of the grain may be entirely closed off, if desired.

$c^4$ represents pulleys upon the shafts of said rolls, and $c^5$ one of the belts by which they are operated.

To hold the feed-gates in any given position, the crank ends of the shafts $c$ $c'$ may be engaged in supporting-arms $a$ upon the case, set-screws $a'$ being provided to bind upon the shafts and hold them in any desired place. This construction enables the operator to adjust the gates quickly whenever he may deem it necessary.

D is a ridge-shaped way in the base of the hopper to divide the grain, so as to feed it from the same hopper upon the grinding-rollers.

E is my improved grinding-bed located between the grinding-rollers F and F'. This bed is concaved upon both sides, as shown in Fig. 2, so as to have a larger contact-surface with the rollers.

I prefer to construct the rollers and the bed with "furrowed corrugations," as shown in Fig. 11, as this construction I find adapted either for grinding or granulating grain.

I have described my invention as a grinding-mill; but I would have it understood that it is equally well adapted for granulating.

The top of the bed is preferably made angular, or with a double incline, as shown in the drawings, its point projecting up between the ridge-shaped ways D, the construction being such that the grain is carried from either side upon the adjacent grinding-rollers.

G and G' represent brackets upon either side of the case which support the adjusting mechanisms for the grinding-rollers. $g$ represents bearing-plates secured thereon. H is a worm provided with a handle or wheel, H', having its bearing in said plate.

I is a gear meshing with the worm, its shaft I' having its bearings in standards at the ends of said plate. It will be observed that there is a worm, H, wheel H', gear I, and shaft I' on each side of the machine. J is an eccentric, one of which is located upon said shafts I' at each end.

K represents sliding boxes, in which the grinding-roller shafts F² are journaled. k are eccentric-rods connected with said journals and with the eccentrics J by means of the bolts k', having located thereon springs K', said bolts being provided with thumb-nuts k², by which they may be adjustably connected with the cases j of the eccentrics J.

It is evident that by turning the hand-wheels H' the gears I are rotated and also the eccentrics upon the shafts I', by which means the grinding-rollers may be adjusted relative to the grinding-bed, as may be desired. By this means the rollers may be adjusted uniformly and evenly upon the grinding-bed.

L are indicators mounted loosely on the fixed shafts l², and L' the fingers connected to said shafts.

h are the pinions upon the shafts of the worm-gears H, meshing with said indicators, as shown in Figs. 2, 4, and 6. It is thus apparent that when shafts I are turned by the worm-gears to move the rollers to or from the concave bed the indicators L are simultaneously turned to the extent indicated by fingers L', and thus show the extent of adjustment of the rolls.

L² is the driving-pulley; L³, the pulley upon the shafts of the grinding-rollers F².

l is the connecting-belt; l', the belt-tightener.

The driving mechanism just alluded to is described and shown in the singular number; but it will be understood that the same may be duplicated at the other end of the machine.

M are cleaning-brushes provided with adjustable weights m upon arms M', which are extended upon the outside of the frame, said brushes being adapted to clean the pulverized flour from the rolls.

The arms M' are pivoted to the case, as shown at m'. By this construction the brushes are held evenly upon the rolls.

The case, as shown, is divided horizontally along the line of the brackets G G', so that access may readily be had to the interior by lifting off the upper part of the case.

I do not confine myself to the use of a single hopper through which to feed both grinding-rolls, as by dividing the hopper, as shown, for instance, in dotted lines in Fig. 2, two different kinds of grain may be fed to and ground by the rollers upon the interior bed. Thus both hard and soft grain may be fed simultaneously.

The dividing-wall indicated in dotted lines may be made removable, so that either the same or different grains may be fed to the rolls, as desired.

The delivery-spout A' may be similarly divided, if desired.

By providing each eccentric-rod with a spring, should any foreign material get between the roll and the bed, the roller is permitted to give, and when the material has passed through the roller will immediately spring back to its proper place. Thus any breakage is prevented.

I provide the hopper with the auxiliary walls b²b³, to prevent the grain falling upon the rear edges of the feed-gates.

N represents an indicator, one on each side for each feed-gate, whereby to adjust the feeding-gates C² and C³. These indicators may each consist of a simple indicator-bar attached to the case in connection with one of the crank-shafts c c', provided with an indicator-finger so arranged that said gates may be adjusted accurately to any desired position, the same being shown upon the indicator. This indicator may be marked to correspond with the indicator L, so that in grinding a particular kind of grain the finger of the crank-shaft may be set upon the indicator to correspond with the adjusted location of the finger L' upon the indicator L, if desired.

The grinding-bed E may be secured in the case in any suitable manner. The same may be provided with attaching-flanges e, for instance.

I prefer to provide the grinding-bed and grinding-rollers with longitudinal corrugations, as shown in Figs. 7 and 8, said corrugations being constructed in the shape shown in Fig. 11, in which the teeth of the roller are constructed with a convex grinding-face. The teeth of the bed are also convexed. Each tooth of the roller is constructed with an outer convex face, as shown in Fig. 11 at f.

Each tooth of the bed is constructed with a convex face, e'.

The faces f and e' constitute the crushing or grinding faces upon the roller and bed, respectively.

Instead of cutting the grain, the grinding-faces of the teeth roll the grain, and in this way clean middlings are obtained.

The construction and arrangement here shown and described provide a very satisfactory grinding-mill.

I have described certain parts in the plural; but it is obvious that they may be used in the singular, and where such is the case the said parts are embraced within my invention.

What I claim is—

1. In a roller-mill, the combination, with grinding-rollers, of an intermediate stationary grinding-bed separating said rollers and having concaved faces upon which said rollers grind, rotatable shafts eccentrically connected with said rollers, and worm-gears to operate said shafts and adjust said rollers upon their concaved grinding-bed, substantially as described.

2. In a roller-mill, the combination, with grinding-rollers, of an intermediate stationary grinding-bed having concaved faces upon which said rollers grind, said bed separating said rollers and the grain ground thereby upon its opposite concaved faces, rotatable shafts eccentrically connected with said rollers, worm-gears to operate said shafts and adjust said rollers upon said grinding-bed, and indicators connected with said gears, substantially as described.

3. The combination, with the adjustable grinding-rollers F F' and the intermediate stationary bed, E, separating said rollers and having concave faces, of the hopper B, having ridge-shaped way D, throats $b\ b'$, and auxiliary inner walls, $b^2\ b^3$, the feed-rollers C C', and adjustable gates $C^2\ C^3$, substantially as described.

4. The combination, with the hopper B, having throats $b\ b'$, the feed-rollers C C', adjustable grinding-rollers F F', and intermediate stationary bed, E, of the adjustable gates $C^2\ C^3$, the crank-shafts $c\ c'$, mounted beneath said gates in engagement therewith and provided with indicating-fingers, and the indicators N, attached to the end of the hopper, substantially as described.

5. The combination, with the casing A, brackets G G', grinding-rollers F F', sliding boxes K, and the intermediate stationary bed, E, of the studs $l^2$, having index-fingers L', the rotatable indicators L, the worm-shafts H, having hand-wheels H' and pinions $h$, the shafts I', having gears I and eccentrics J J, and eccentric-rods $k$, for connecting the eccentric-straps and sliding roller-boxes, substantially as described.

In testimony whereof I sign this specification in the presence of two witnesses.

FRANK LAUHOFF.

Witnesses:
N. S. WRIGHT,
M. B. O'DOGHERTY.